(12) United States Patent
Schwarz et al.

(10) Patent No.: US 11,203,982 B2
(45) Date of Patent: *Dec. 21, 2021

(54) TURBOFAN ENGINE FRONT SECTION

(71) Applicant: Raytheon Technologies Corporation, Farmington, CT (US)

(72) Inventors: Frederick M. Schwarz, Glastonbury, CT (US); William G. Sheridan, Southington, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 274 days.

This patent is subject to a terminal disclaimer.

(21) Appl. No.: 16/436,569

(22) Filed: Jun. 10, 2019

(65) Prior Publication Data

US 2020/0032715 A1 Jan. 30, 2020

Related U.S. Application Data

(63) Continuation of application No. 14/888,154, filed as application No. PCT/US2014/036475 on May 2, 2014, now Pat. No. 10,316,758.

(60) Provisional application No. 61/821,387, filed on May 9, 2013.

(51) Int. Cl.
*F02C 7/36* (2006.01)
*F02K 3/06* (2006.01)

(52) U.S. Cl.
CPC .............. *F02C 7/36* (2013.01); *F02K 3/06* (2013.01); *F05D 2260/40311* (2013.01)

(58) Field of Classification Search
CPC ............................ F02C 7/36; F05D 2260/403
See application file for complete search history.

(56) References Cited

U.S. PATENT DOCUMENTS

| | | |
|---|---|---|
| 2,154,532 A | 4/1939 | Ryder |
| 3,860,361 A | 1/1975 | McMurty et al. |
| 4,251,987 A | 2/1981 | Adamson |
| 4,446,696 A | 5/1984 | Sargisson et al. |
| 4,815,273 A | 3/1989 | Rudolph et al. |
| 4,827,712 A | 5/1989 | Coplin |
| 5,102,379 A | 4/1992 | Pagluica et al. |
| 5,389,048 A | 2/1995 | Carlson |
| 5,466,198 A | 11/1995 | McKibbin et al. |

(Continued)

OTHER PUBLICATIONS

Johnston, R.P., Hirschkron, R., Koch, C.C., Neitzel, R.E., and Vinson, P.W. (1978). Energy efficient engine: Preliminary design and integration study-final report. NASA CR-135444. Sep. 1978. pp. 1-401.

(Continued)

*Primary Examiner* — Gerald L Sung
(74) *Attorney, Agent, or Firm* — Carlson, Gaskey & Olds, P.C.

(57) ABSTRACT

A turbofan engine includes a geared architecture for driving a fan about an axis. The geared architecture includes a sun gear rotatable about an axis, a plurality of planet gears driven by the sun gear and a ring gear circumscribing the plurality of planet gears. A carrier supports the plurality of planet gears. The geared architecture includes a power transfer parameter (PTP) defined as power transferred through the geared architecture divided by gear volume multiplied by a gear reduction ratio and is between 219 and 328.

23 Claims, 3 Drawing Sheets

(56) References Cited

U.S. PATENT DOCUMENTS

| | | | |
|---|---|---|---|
| 5,685,797 | A | 11/1997 | Barnsby et al. |
| 6,223,616 | B1 | 5/2001 | Sheridan |
| 6,964,155 | B2 | 11/2005 | McCune et al. |
| 7,694,505 | B2 * | 4/2010 | Schilling .................. F02K 3/06 |
| | | | 60/226.1 |
| 7,752,836 | B2 * | 7/2010 | Orlando .................. F02C 3/067 |
| | | | 60/268 |
| 8,075,261 | B2 | 12/2011 | Merry et al. |
| 8,261,527 | B1 | 9/2012 | Stearns et al. |
| 8,333,678 | B2 * | 12/2012 | McCune .............. F01D 25/162 |
| | | | 475/331 |
| 8,869,504 | B1 * | 10/2014 | Schwarz .................. F02C 7/28 |
| | | | 60/226.1 |
| 2003/0163983 | A1 | 9/2003 | Seda et al. |
| 2004/0255590 | A1 | 12/2004 | Rago et al. |
| 2005/0109012 | A1 | 5/2005 | Johnson |
| 2006/0254253 | A1 | 11/2006 | Herlihy et al. |
| 2007/0087892 | A1 | 4/2007 | Orlando et al. |
| 2007/0217914 | A1 | 9/2007 | Fujimura |
| 2007/0225111 | A1 * | 9/2007 | Duong ..................... F16D 3/72 |
| | | | 475/331 |
| 2008/0022653 | A1 | 1/2008 | Schilling |
| 2008/0120839 | A1 | 5/2008 | Schilling |
| 2009/0071121 | A1 | 3/2009 | Suciu et al. |
| 2010/0331140 | A1 | 12/2010 | McCune |
| 2011/0206498 | A1 | 8/2011 | McCooey |
| 2012/0023747 | A1 | 2/2012 | Slayter et al. |
| 2012/0251306 | A1 | 10/2012 | Reinhardt et al. |
| 2013/0025257 | A1 | 1/2013 | Suciu et al. |
| 2013/0192264 | A1 | 8/2013 | McCune et al. |
| 2013/0259687 | A1 * | 10/2013 | Suciu ...................... F02C 7/047 |
| | | | 416/1 |
| 2016/0108807 | A1 * | 4/2016 | Schwarz .................. F01D 5/12 |
| | | | 60/805 |
| 2016/0131028 | A1 | 5/2016 | Lauer et al. |
| 2016/0245184 | A1 * | 8/2016 | Schwarz .................. F02C 7/36 |
| 2017/0082031 | A1 * | 3/2017 | Miller ................. F16H 57/0006 |
| 2019/0048826 | A1 * | 2/2019 | Pointon ..................... F02C 7/04 |

OTHER PUBLICATIONS

Johnston, R.P. and Hemsworth, M.C. (1978). Energy efficient engine preliminary design and integration studies. Jun. 1, 1978. pp. 1-28.

Awker, R.W. (1986). Evaluation of propfan propulsion applied to general aviation. NASA CR-175020. Mar. 1, 1986. pp. 1-140.

Howe, D.C. and Wynosky, T.A. (1985). Energy efficient engine program advanced turbofan nacelle definition study. NASA CR-174942. May 1, 1985. pp. 174.

Singh, B. (1986). Small engine component technology (SECT) study. NASA CR-175079. Mar. 1, 1986. pp. 1-102.

Liebeck, R.H., Andrastek, D.A., Chau, J., Girvin, R., Lyon, R., Rawdon, B.K., Scott, P.W. et al. (1995). Advanced subsonic airplane design & economics studies. NASA CR-195443. Apr. 1995. pp. 1-187.

Anderson, R.D. (1985). Advanced Propfan Engine Technology (APET) definition study, single and counter-rotation gearbox/pitch change mechanism design. NASA CR-168115. Jul. 1, 1985. pp. 1-289.

Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 2986. pp. 1-101.

Gliebe, P.R., Ho, P.Y., and Mani, R. (1995). UHB engine fan and broadband noise reduction study. NASA CR-198357. Jun. 1995. pp. 1-48.

Holcombe, V. (2003). Aero-Propulsion Technology (APT) task V low noise ADP engine definition study. NASA CR-2003-212521. Oct. 1, 2003. pp. 1-73.

Sutliff, D. (2005). Rotating rake turbofan duct mode measurement system. NASA TM-2005-213828. Oct. 1, 2005. pp. 1-34.

Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.

NASA Conference Publication. (1978). CTOL transport technology. NASA-CP-2036-PT-1. Jun. 1, 1978. pp. 1-531.

Gray, D.E. (1978). Energy efficient engine preliminary design and integration studies. NASA-CP-2036-PT-1. Nov. 1978. pp. 89-110.

Kandebo, S.W. (1993). Pratt & Whitney launches geared turbofan engine. Aviation Week & Space Technology, 148(8). p. 32-4.

Kandebo, S.W. (1993). Geared-Turbofan engine design targets cost, complexity. Aviation Week & Space Technology, 148(8). p. 34-5.

Davis, D.G.M. (1973). Variable-pitch fans: Progress in Britain. Flight International. Apr. 19, 1973. pp. 615-7.

Levintan, R.M. (1975). Q-Fan demonstrator engine. Journal of Aircraft. vol. 12( 8). Aug. 1975. pp. 658-663.

Aerospace Information Report. (2008). Advanced ducted propulsor in-flight thrust determination. SAE International AIR5450. Aug. 2008. p. 1-392.

Technical Report. (1975). Quiet Clean Short-haul Experimental Engine (QCSEE) UTW fan preliminary design. NASA-CR-134842. Feb. 1, 1975. pp. 1-98.

Daggett, D.L., Brown, S.T., and Kawai, R.T. (2003). Ultra-efficient engine diameter study. NASA/CR-2003-212309. May 2003. pp. 1-52.

Technical Report. (1975). Quiet Clean Short-haul Experimental Engine (QCSEE) Under-the-Wing (UTW) final design report. NASA-CR-134847. Jun. 1, 1977. pp. 1-697.

2003 NASA seal/secondary air system workshop. (2003). NASA/CP-2004-212963/vol. 1. Sep. 1, 2004. pp. 1-408.

Berton, J.J. and Guynn, M.D. (2012). Multi-objective optimization of a turbofan for an advanced, single-aisle transport. NASA/TM-2012-217428. pp. 1-26.

Chapman, J.W. and Litt, J.S. (2017). Control design for an advanced geared turbofan engine. AIAA Joint Propulsion Conference 2017. Jul. 10, 2017-Jul. 12, 2017. Atlanta, GA. pp. 1-12.

Dalton, III., W.N. (2003). Ultra high bypass ratio low noise engine study. NASA/CR-2003-212523. Nov. 2003. pp. 1-187.

Edkins, D.P., Hirschkron, R., and Lee, R. (1972). TF34 turbofan quiet engine study. Final Report prepared for NASA. NASA-CR-120914. Jan. 1, 1972. pp. 1-99.

Fisher, K., Berton, J., Guynn, M., Haller B., Thurman, D., and Tong, M. (2012). NASA's turbofan engine concept study for a next-generation single-aisle transport. Presentation to ICAO's noise technology independent expert panel. Jan. 25, 2012. pp. 1-23.

Greitzer, E.M., Bonnefoy, P.A., Delaroseblanco,E., Dorbian, C.S., Drela, M., Hall, D.K., Hansman, R.J., Hileman, J.I., Liebeck, R.H., Levegren, J. (2010). N+3 aircraft concept designs and trade studies, final report. vol. 1. Dec. 1, 2010. NASA/CR-2010-216794A/vol. 1. pp. 1-187.

Guynn, M.D., Berton, J.J., Fisher, K.L., Haller, W.J., Tong, M.T., and Thurman, D.R. (2009). Engine concept study for an advanced single-aisle transport. NASA/TM-2009-215784. pp. 1-97.

Guynn, M.D., Berton, J.J., Fisher, K.L., Haller, W.J., Tong, M. T., and Thurman, D.R. (2009). Analysis of turbofan design options for an advanced single-aisle transport aircraft. American Institute of Aeronautics and Astronautics, pp. 1-13.

Mavris, D.N., Schutte, J.S. (2016). Application of deterministic and probabilistic system design methods and enhancements of conceptual design tools for ERA project final report. NASA/CR-2016-219201. May 1, 2016. pp. 1-240.

McCracken, R.C. (1979). Quiet short-haul research aircraft familiarization document. NASA-TM-81149. Nov. 1, 1979. pp. 1-76.

Litt, J.S. (2018). Sixth NASA Glenn Research Center propulsion control and diagnostics (PCD) workshop. NASA/CP-2018-219891. Apr. 1, 2018. pp. 1-403.

Rotordynamic instability problems in high-performance turbomachinery. (1986). NASA conference publication 2443. Jun. 2-4, 1986.

Sargisson, D.F. (1985). Advanced propfan engine technology (APET) and single-rotation gearbox/pitch change mechanism. NASA Conliactor Report-168113. R83AEB592. Jun. 1, 1985. pp. 1-476.

Singh, R. and Houser, D.R. (1990). Non-linear dynamic analysis of geared systems. NASA-CR-180495. Feb. 1, 1990. pp. 1-263.

(56) References Cited

OTHER PUBLICATIONS

Smith, C.E., Hirschkron, R., and Warren, R.E. (1981). Propulsion system study for small transport aircraft technology (STAT). Final report. NASA-CR-165330. May 1, 1981. pp. 1-216.
Tong, M.T., Jones, S.M., Haller, W.J., and Handschuh, R.F. (2009). Engine conceptual design studies for a hybrid wing body aircraft. NASA/TM-2009-215680. Nov. 1, 2009. pp. 1-15.
Bloomer, H.E., Loeffler, I.J., Kreim, W.J., and Coats, J.W. (1981). Comparison of NASA and contractor reslts from aeroacoustic tests of QCSEE OTW engine. NASA Technical Memorandum 81761. Apr. 1, 1981. pp. 1-30.
Bloomer, H.E. and Samanich, N.E. (1982). QCSEE under-the-wing engine acoustic data. NASA-TM-82691. May 1, 1982. pp. 1-28.
Bloomer, H.E. and Loeffler, I.J. (1982). QCSEE over-the-wing engine acoustic data. NASA-TM-82708. May 1, 1982. pp. 1-558.
Bloomer, H.E. and Samanich, N.E. (1982). QCSEE under-the-wing enging-wing-flap aerodynamic profile characteristics. NASA-TM-82890. Sep. 1, 1982. pp. 1-48.
Howard, D.F. (1976). QCSEE preliminary under the wing flight propulsion system analysis report. NASA CR-134868. Feb. 1, 1976. pp. 1-260.
Misel, O.W. (1977). QCSEE main reduction gears test program. NASA CR-134669. Mar. 1, 1977. pp. 1-222.
QCSEE Preliminary analyses and design report. vol. 1. (1974). NASA-CR-134838. Oct. 1, 1974. pp. 1-337.
QCSEE preliminary analyses and design report. vol. II. (1974). NASA-CR-134839. Oct. 1, 1974. pp. 340-630.
QCSEE under-the-wing engine composite fan blade design. (1975). NASA-CR-134840. May 1, 1975. pp. 1-51.
QCSEE the aerodynamic and preliminary mechanical design of the QCSEE OTW fan. (1975). NASA-CR-134841. Feb. 1, 1975. pp. 1-74.
QCSEE under-the-wing engine composite fan blade preliminary design test report. (1975). NASA-CR-134846. Sep. 1, 1975. pp. 1-56.
QCSEE over-the-wing final design report. (1977). NASA-CR-134848. Jun. 1, 1977. pp. 1-503.
QCSEE hamilton standard cam/harmonic drive variable pitch fan actuation system derail design report. (1976). NASA-CR-134852. Mar. 1, 1976. pp. 1-172.
QCSEE main reduction gears bearing development program final report. (1975). NASA-CR-134890. Dec. 1, 1975. pp. 1-41.
QCSEE under-the-wing engine digital collrol system design report. (1978). NASA-CR-134920. Jan. 1, 1978. pp. 1-309.
QCSEE the aerodynamic and mechanical design of the QCSEE under-the-wing fan. (1977). NASA-CR-135009. Mar. 1, 1977. pp. 1-137.
OCSEE under-the-wing engine composite fan blade final design test report. (1977). NASA-CR-135046. Feb. 1, 1977. pp. 1-55.
QCSEE over-the-wing propulsion system test report vol. III—mechanical performance. (1978). NASA-CR-135325. Feb. 1, 1978. pp. 1-112.
QCSEE ball spline pitch-change mechanism whirligig test report. (1978). NASA-CR-135354. Sep. 1, 1978. pp. 1-57.
Quiet clean general aviation turbofan (QCGAT) technology study final report vol. I. (1975). NASA-CR-164222. Dec. 1, 1975. pp. 1-186.
Neitzel, R.E., Hirschkron, R. and Johnston, R.P. (1976). Study of unconventional aircraft engines designed for low energy consumption. NASA-CR-135136. Dec. 1, 1976. pp. 1-153.
Neitzel, R., Lee, R., and Chamay, A.J. (1973). Engine and installation preliminary design. Jun. 1, 1973. pp. 1-333.
Parametric study of STOL short-haul transport engine cycles and operational techniques to minimize community noise impact. NASA-CR-114759. Jun. 1, 1974. pp. 1-398.
Sowers, H.D. and Coward, W.E. (1978). QCSEE over-the-wing (OTW) engine acuostic design. NASA-CR-135268. Jun. 1, 1978. pp. 1-52.
Schaefer, J.W., Sagerser, D.R., and Stakolich, E.G. (1977). Dynamics of high-bypass-engine thrust reversal using a variable-pitch fan. Technical Report prepared for NASA. NASA-TM-X-3524. May 1, 1977. pp. 1-33.
Jane's Aero-Engines, Edited by Bill Gunstron, Issue Seven, five pages.
Performance and Weight Estimates for an Advanced Open Rotor Engine, Eric S. Hendricks and Michael T. Tong, NASA/TM-2012-217710, AIAA-2012-3911, Sep. 2012, pp. 1-13.
International Search Report and Written Opinion for International Application No. PCT/US2014/036475 dated Feb. 2, 2016.
International Preliminary Report on Patentability for International Application No. PCT/US2014/036475 dated Feb. 18, 2016.
Zimbrick, R. A. et al., Investigation of Very High Bypass Ratio Engines for Subsonic Transports, Journal of Propulsion and Power, American Institute of Aeronautics and Astronautics, vol. 6, No. 4, Jul. 1, 1990, pp. 490-496.
Kandebo, Stanley W., Pratt & Whitney Launches Geared Turbofan Engine, Aviation Week and Space Technology, vol. 148, No. 8, Feb. 23, 1998, pp. 32-34.
European Search Report for EP Application No. 14795071.1 dated Mar. 2, 2017.
Sabnis, Jayant et al., "The PW1000G Pure Power New Engine Concept and Its Impact on MRO," MTU Aero Engines, Av Week Engine MRO Forum, Dec. 1, 2010, pp. 1-45, XP055155486, Munich, Germany.
Summons to Oral Proceedings for European Patent Application No. 14795071.1 dated Dec. 22, 2020.

\* cited by examiner

TURBOFAN ENGINE FRONT SECTION

CROSS REFERENCE TO RELATED APPLICATION

This application is a continuation of U.S. patent application Ser. No. 14/888,154 filed on Oct. 30, 2015, now U.S. Pat. No. 10,316,758, granted on Jun. 11, 2019, which is a National Phase Application of International Application No. PCT/US2014/036475 filed on May 2, 2014, which claims priority to U.S. Provisional Application No. 61/821,387 filed on May 9, 2013.

BACKGROUND

A turbofan engine includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

A speed reduction device such as an epicyclical gear assembly may be utilized to drive the fan section such that the fan section may rotate at a speed different than the turbine section so as to increase the overall propulsive efficiency of the engine. The geared architecture may be located in a front section of the engine and thereby influences how airflow paths are defined to the compressor section. Airflow efficiency into the compressor section provides increased overall engine efficiency and therefore any improvements are desirable.

Turbofan engine manufacturers continue to seek improvements to engine performance including improvements to thermal, transfer and propulsive efficiencies.

SUMMARY

A turbofan engine according to an exemplary embodiment of this disclosure, among other possible things includes a fan section including a fan hub including a hub diameter supporting a plurality of fan blades including a tip diameter with a ratio of the hub diameter to the tip diameter is between about 0.24 and about 0.36, a compressor section, a combustor receives airflow from the compressor section and generates a high-energy flow, a turbine section is driven by the high-energy flow, and a geared architecture is driven by the turbine section for rotating the fan hub at a speed different than the turbine section. The geared architecture includes a gear volume between about 526 in³ and about 790 in³.

In a further embodiment of the foregoing turbofan engine, the geared architecture includes an axial length between about 3.03 and about 4.60 inches.

In a further embodiment of any of the foregoing turbofan engines, the turbofan engine includes an overall axial distance from a forward part of the fan hub to a forward bearing assembly and a ratio of the overall axial distance to the axial length of the geared architecture is between about 6 and about 18.

In a further embodiment of any of the foregoing turbofan engines, the geared architecture includes an epicyclic gear system including a ring gear circumscribing a plurality of planetary gears driven by a sun gear and a carrier supporting the planetary gears and the gear volume is defined within a space bounded by the ring gear and outer periphery of the carrier.

In a further embodiment of any of the foregoing turbofan engines, a geared architecture power transfer parameter (PTP) is defined as power transferred through the geared architecture divided by gear volume multiplied by a gear reduction ratio and is between about 219 and 328.

In a further embodiment of any of the foregoing turbofan engines, includes a compressor entrance passage disposed around the geared architecture including an inlet disposed at an inlet diameter and an outlet to the compressor disposed at an outlet diameter. A ratio of the inlet diameter to the outlet diameter is between about 1.22 and about 1.82.

In a further embodiment of any of the foregoing turbofan engines, a ratio of the hub diameter to the inlet diameter is between about 0.63 and about 0.94.

In a further embodiment of any of the foregoing turbofan engines, the geared architecture includes an outer diameter less than the inlet diameter.

In a further embodiment of any of the foregoing turbofan engines, the geared architecture includes an outer diameter greater than the inlet diameter.

In a further embodiment of any of the foregoing turbofan engines, includes a forward bearing assembly spaced an axial distance from the outlet to the compressor and an overall distance from a forward part of the fan hub and a ratio of the overall distance relative to the axial distance between the bearing assembly and the outlet to the compressor is between about 4.3 and 17.5.

In a further embodiment of any of the foregoing turbofan engines, includes a forward bearing assembly disposed at a diameter and a ratio of the outlet diameter of the compressor to the bearing assembly diameter is between about 1.95 and 2.92.

In a further embodiment of any of the foregoing turbofan engines, the geared architecture includes an epicyclic gear system including a ring gear circumscribing a plurality of planetary gears driven by a sun gear and a carrier supporting the planetary gears and the gear volume is defined within a space bounded by the ring gear and outer periphery of the carrier.

In a further embodiment of any of the foregoing turbofan engines, the turbofan engine is sized to generate thrust ranging between about 12,500 lbf and 17,500 lbf.

A front section of a turbofan engine according to an exemplary embodiment of this disclosure, among other possible things includes a fan section including a fan hub including a hub diameter supporting a plurality of fan blades including a tip diameter with a ratio of the hub diameter to the tip diameter is between about 0.24 and about 0.36, a geared architecture driven by a turbine section for rotating the fan about the axis, and a compressor entrance passage disposed around the geared architecture including an inlet disposed at an inlet diameter and an outlet disposed at an outlet diameter, wherein a ratio of the inlet diameter to the outlet diameter is between about 1.22 and about 1.82.

In a further embodiment of the foregoing front section, a ratio of the hub diameter to the inlet diameter is between about 0.63 and about 0.94.

In a further embodiment of any of the foregoing front sections, the geared architecture includes an outer diameter less than the outlet diameter.

In a further embodiment of any of the foregoing front sections, the geared architecture includes an epicyclic gear system including a ring gear circumscribing a plurality of planetary gears driven by a sun gear and a carrier supporting the planetary gears and the gear volume is defined within a space bounded by the ring gear and outer periphery of the carrier.

In a further embodiment of any of the foregoing front sections, the gear volume is between about 526 in³ and about 790 in³.

In a further embodiment of any of the foregoing front sections, a geared architecture power transfer parameter (PTP) is defined as power transferred through the geared architecture divided by gear volume multiplied by a gear reduction ratio and is between about 219 and 328.

In a further embodiment of any of the foregoing front sections, includes an overall axial length between a forward portion of the fan hub and a forward bearing assembly, wherein the forward bearing assembly is spaced axially aft of the outlet to the compressor an axial length and a ratio of the overall length to the axial length between the forward bearing assembly and the outlet is between about 4.3 and about 17.5.

In a further embodiment of any of the foregoing front sections, includes a forward bearing assembly disposed at a diameter and a ratio of the outlet diameter to the bearing assembly diameter is between about 1.95 and 2.92.

In a further embodiment of any of the foregoing front sections, includes an overall axial length between a forward portion of the fan hub and a forward bearing assembly. The geared architecture includes an axial length and a ratio of the overall length to the axial length of the geared architecture is between about 6 and about 18.

A geared architecture for a turbofan engine according to an exemplary embodiment of this disclosure, among other possible things includes a sun gear rotatable about an axis, a plurality of planet gears driven by the sun gear, a ring gear circumscribes the plurality of planet gears, and a carrier supports the plurality of planet gears. A geared architecture power transfer parameter (PTP) is defined as power transferred through the geared architecture divided by gear volume multiplied by a gear reduction ratio and is between about 219 and 328.

In a further embodiment of the foregoing geared architecture, the gear volume is defined within a space bounded by the ring gear and outer periphery of the carrier.

In a further embodiment of any of the foregoing geared architectures, the gear volume is between about 526 in³ and about 790 in³.

In a further embodiment of any of the foregoing geared architectures, includes an axial length between about 3.03 inches and about 4.60 inches.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
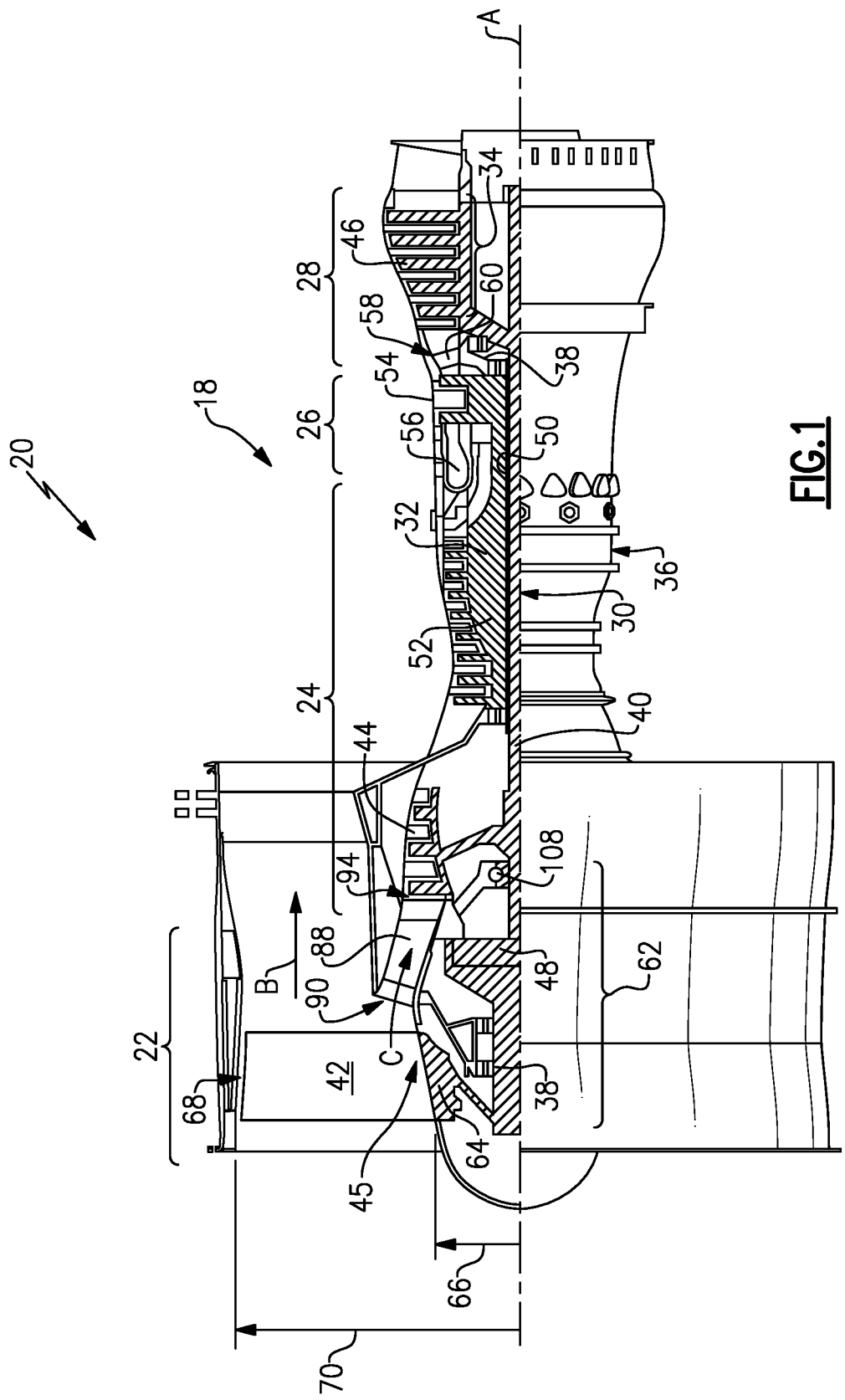
FIG. 1 is a schematic view of an example turbofan engine.

FIG. 1 schematically illustrates an example turbofan engine 20 that includes a fan section 22 and a core engine section 18 that includes a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the turbofan engine 20 is increased and a higher power density may be achieved.

The disclosed turbofan engine 20 in one example is a high-bypass geared aircraft engine. In a further example, the turbofan engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the turbofan engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by airflow through the bypass flow path B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram °R)/(518.7°R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about twenty-six (26) fan blades. In another non-limiting embodiment, the fan section 22 includes less than about twenty (20) fan blades. Moreover, in one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example turbofan engine 20 with increased power transfer efficiency.

The gas turbofan engine 20 includes a front section 62 extending from the fan section 22 axially aft to bearing assembly 108 supporting a forward portion of the low speed spool 30. The front section 62 includes the fan section 22, the geared architecture 48, and compressor inlet passage 88 part of the core flow path C. The fan section 22 includes a fan hub 64 that supports the fan blades 42.

The fan hub 64 supports each of the blades 42 for rotation about the axis A. Each of the blades 42 includes a blade tip 68. A tip diameter 70 is disposed between opposing blade tips 68 and defines the diameter of the fan section 22. The blades 42 extend from a root portion 45 supported within a fan hub 64. The fan hub 64 defines a hub diameter 66. The hub diameter 66 is related to the tip diameter 70 according to a ratio that reflects a size of the bypass flow path B related to the core engine section 18. In the disclosed embodiment the ratio of hub diameter 66 to the tip diameter 70 is between about 0.24 and about 0.36.

The core flow path C includes a compressor inlet passage 88 that is disposed annularly about the geared architecture 48. The compressor inlet passage 88 includes an inlet 90 into supporting structure for the geared architecture 48 and the fan hub 64 and an outlet 94 aft of the supporting structure. The outlet 94 directs air into a first stage of the low pressure compressor 44. The hub 64, inlet 90 and outlet 94 define a path for air entering the turbofan engine 20 and entering the low pressure compressor 44.

Figure 2:
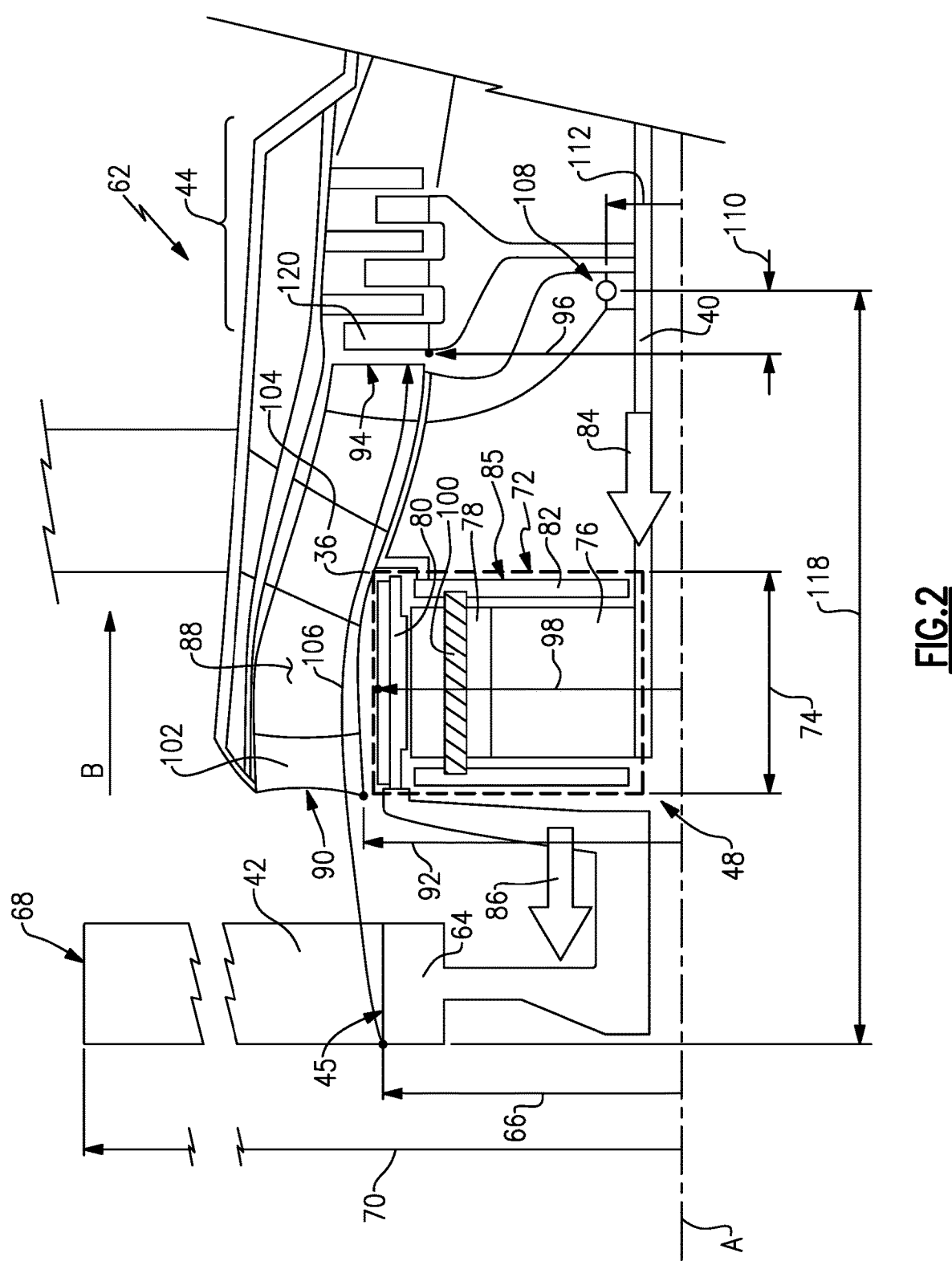
FIG. 2 is a schematic view of an example front section of a turbofan engine.

Referring to FIG. 2, with continued reference to FIG. 1, the inlet 90 is set at an inlet diameter 92 and the outlet 94 is set at an outlet diameter 96. The inlet 90 is at the leading edge and innermost radius of the first vane 102 aft of the fan section 22. The outlet 94 is the innermost radius of the first rotating airfoil 120 of the first or low pressure compressor 44. The hub diameter 66, inlet diameter 92 and outlet diameter 96 define a transitional flow path 106 into the low pressure compressor 44. The transitional flow path 106 includes complex flow fields with swirl components that are turned by vanes 102 and 104 within the compressor inlet passage 88 to provide desired axially oriented flows.

The transitional flow path 106 includes relatively low diametrical changes to provide a smooth aerodynamic flow path into the low pressure compressor 44. The shape of the transitional flow path 106 greatly improves and simplifies aerodynamic flow performance through the compressor inlet passage 88 to increase engine efficiency.

The shape of the transitional flow path 106 is defined by ratios between the hub diameter 66, inlet diameter 92 and outlet diameter 96. The disclosed transitional flow path 106 includes a ratio of the inlet diameter 92 to the outlet diameter 96 that is between about 1.22 and about 1.82. The transitional flow path 106 further includes a ratio of the hub diameter 66 to the inlet diameter 92 that is between about 0.63 and about 0.94.

In one example engine embodiment, the hub diameter 66 is between about 16.0 inches (40.6 cm) and about 19.5 inches (49.5 cm). The inlet diameter 92 is between about 20.6 inches (52.3 cm) and about 25.3 inches (64.2 cm). The outlet diameter 96 is between about 13.8 inches (35.0 cm) and about 16.8 inches (42.6 cm).

The inlet diameter 92 is the largest of the diameters 66, 92 and 96 defining the transitional flow path 106 and defines a necessary inflection point from the convergence of the root portion 45 of the fan blade 42 that provides desired aerodynamic performance.

The transitional flow path 106 between the hub diameter 66, the inlet diameter 92 and outlet diameter 96 is enabled by a gear diameter 98 defined by the geared architecture 48 and by the axial and radial position of the forward bearing assembly 108. The forward bearing assembly 108 is positioned axially and radially relative to the low pressure compressor 44 to enable the subtle changes in the transitional flow path 106. Accordingly, the inlet diameter 92, and therefore the desired inflection point is enabled by the size of the geared architecture 48, and the outlet diameter 96 is enabled by the size and position of the forward bearing assembly 108.

The geared architecture 48 includes a sun gear 76 driven by the low pressure turbine 46 through the inner shaft 40. The sun gear 76 drives intermediate planetary gears (either planet gears or star gears) 78 supported for rotation by journal bearings 100. A carrier 82 supports the journal bearings 100 and thereby the planetary gears 78. A ring gear 80 circumscribes the planetary gears 78. In this example, the ring gear 80 is attached to drive the fan hub 64 about the axis A. The carrier 82 is fixed and holds the intermediate planetary gears 78 from rotation about the axis A.

The geared architecture 48 illustrated in FIG. 1 is a star epicyclical configuration where the ring gear 80 is driven about the axis A and the carrier 80 is fixed to a portion of the engine static structure 36. However, other gear configurations are within the contemplation of this disclosure.

Figure 3:
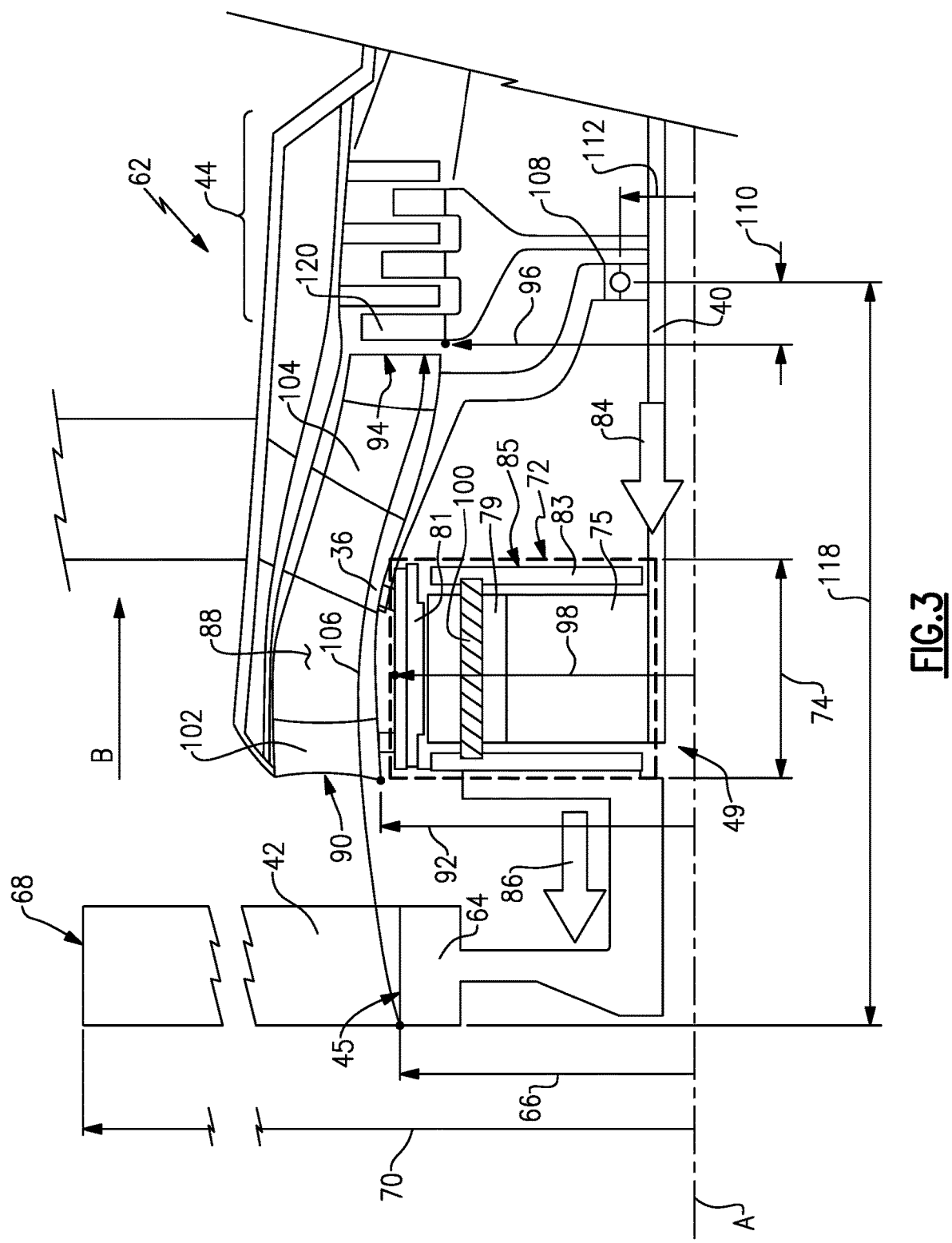
FIG. 3 is a schematic view of another example front section of a turbofan engine.

Referring to FIG. 3, another geared architecture 49 is shown that includes a sun gear 75 that drives planet gears 79 supported in a carrier 83 that is attached to drive a fan hub 65. A ring gear 81 circumscribes the planet gears 79 and is fixed to a portion of the engine static structure 36. The geared architecture 49 drives the fan hub 65 through rotation of the planet gears 79 and carrier 83 about the axis A and is referred to as a planet epicyclical gear configuration. The disclosed features and size are applicable to either of the disclosed geared architectures 48, 49 illustrated schematically in FIGS. 2 and 3. Further explanation and disclosure are explained with regard to the geared architecture 48 illustrated in FIG. 2, but is just as applicable to the embodiment illustrated and explained in FIG. 3.

Referring back to FIGS. 1 and 2, the carrier 82 includes an outer periphery 85 and the ring gear 80 includes the gear diameter 98 that combines to define a gear volume 72. The gear diameter 98 defined by the ring gear 80 and carrier 82 define the boundary of the gear volume 72. The gear volume 72 includes the elements of the geared architecture such as the journal bearings, 100, carrier 80, sun gear 76, planetary gears 78 and ring gear 80. The gear volume 72 does not encompass the mounting and flexible structures that may be utilized to support the geared architecture.

The gear volume 72 is the annular volume about the axis A, defined within the bounds of the gear diameter 98 and axial length 74. The axial length 74 of the geared architecture 48 includes the carrier 82. In the disclosed example, the geared architecture 48 includes an axial length 74 between about 3.03 inches (7.6 cm) and about 4.60 inches (11.6 cm).

The geared architecture 48 provides for the transmission of input horsepower 84 from the low pressure turbine 46 to output horsepower 86 to the fan section 22. The efficient transmission of input horsepower 84 is enabled by the configuration defining the gear volume 72. In this example, the gear volume is between about 526 in³ (8619 cm³) and about 790 in³ (12945 cm³).

The gearbox volume is necessary for the transfer of power from the fan drive or low pressure turbine 46 to the fan section 22. The gear diameter 98 is held close to the fan hub diameter 66 to define the flowpath 106 to be as short and unvarying in diameter as possible. The short and unvarying diameter of the transitional flow path 106 enables preferred pressure recovery between the fan blade root 45, the inlet 92 and the outlet 94 to the first rotating stage of the first or low pressure compressor 44.

In one example, the range of gear volume 72 is provided for an engine 20 that generates thrust ranging between about 12,500 lbf (55,602 N) and 17,500 lbf (77,843 N). The thrust generated is a function of the efficiency of the engine configuration and of the transfer of horsepower through the geared architecture 48. A measure of the efficiency of the geared architecture for a give volume is a power transfer parameter (PTP) and is defined as the power transferred through the geared architecture 48 divided by the gear volume 72 and multiplied by an overall gear ratio, a set out in Equation 1.

Power Transfer Parameter=[Power Transferred (HP)/ Gear Volume (in³)]×overall gear ratio.     Equation 1:

The PTP provides a normalized factor for comparison between geared architectures for different engine configurations. Moreover the gear ratio accounts for the extra work performed for higher gear ratios. Embodiments of the geared turbofan engine that include the disclosed geared architecture 48 gear volumes 72 and that generate thrust ranging between about 12,500 lbf (55,602 N) and 17,500 lbf (77,843 N) include a PTP of between about 219 and about 328.

The PTP of the example geared architecture 48 enables increased transfer of power while maintaining a size and volume that further enables the transitional flow path 106 orientations that provide desired aerodynamic flow properties.

The forward bearing assembly 108 is disposed at an axial distance 110 from the outlet 94 to support rotation of the forward portion of the low speed spool 30 including the low pressure compressor 44. The position of the forward bearing assembly 108 provides a desired balance and rotational support of the low pressure compressor 44. Placement of the forward bearing assembly 108 is desired within a mid-region of the compressor 44 and requires a radial space sufficient to support lubricant and cooling features required during operation. Accordingly, a diameter 112 of the bearing assembly 108 has a direct effect on the configuration of the low pressure compressor 44 and thereby the position of the outlet 94. Moreover, the axial distance 118 from the forward tip of the hub 64 to the bearing assembly 108 is enabled by the size and volume of the geared architecture 48 and combined with the position of the forward bearing assembly 108 enables the desirable design of the transitional flow path 106.

In one disclosed dimensional engine embodiment the diameter 112 measured to a center point of the bearing assembly 108 is between about 5.75 inches (14.6 cm) and about 7.08 inches (17.9 cm). The axial distance 110 is between about 3.0 inches (7.62 cm) and about 6.25 inches (15.8 cm). An overall axial length 118 of the front section 62 from the hub diameter 66 at the forward portion of the fan hub 64 to the forward bearing assembly is between about 27.0 inches (68.6 cm) and about 54.2 inches (137.7 cm). The axial distance 110 between the outlet 94 and the bearing assembly 108 enable the desired reduced length of the forward section 62.

The disclosed dimensional embodiment is only one example enabling the disclosed configuration of the transitional flow path 106. The configuration of disclosed engine embodiments is reflected in a ratio of the overall length 118 to the axial distance 110 that is between about 4.3 and 17.5. Moreover, a ratio between the outlet diameter 96 and the bearing assembly diameter 112 is between about 1.95 and 2.92. These ratios reflect the configuration that enables the radial and axial position of the outlet 94.

The axial length 74 of the geared architecture 48 further enables the desired relatively flat transitional flow path 106. The volume of the geared architecture 48 enables the power transfer to the fan hub 64 and is a factor determined by the axial length 74 and the gear diameter 98. Decreasing the gear diameter 98 enables a corresponding reduction in axial length 74 that in turn enables the desired configuration of the transitional flow path 106.

Therefore, a relationship between the axial length 74 of the geared architecture and the overall length 118 of the front section 62 further reflects the disclosed configuration of the transitional flow path 106 and engine 20. A ratio of the overall length 118 as related to the axial length 74 of the geared architecture 48 is between about 6 and about 18. The ratio of the overall length 118 to the axial length 74 reflects the disclosed geared architecture 48 including the gear diameter 98 and volume 72 that the desired configuration of the transitional flow path 106 and front section 62.

Accordingly, the gear volume 72, gear diameter 98, and axial length 74 of the geared architecture along with the location of the forward bearing assembly 108 enable an efficient transitional flow path 106 in the disclosed compact front section 62.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbofan engine comprising:
   a fan section including a plurality of fan blades and a fan hub;
   a compressor section including a compressor entrance passage including an inlet disposed at an inlet diameter and an outlet to the compressor disposed at an outlet diameter, wherein a ratio of the inlet diameter to the outlet diameter is between 1.22 and 1.82;
   a combustor receiving airflow from the compressor section and generating a high-energy flow;
   a turbine section driven by the high-energy flow;
   a geared architecture configured to be driven by the turbine section for rotating the fan hub at a speed different than the turbine section, wherein a geared architecture power transfer parameter (PTP) is defined as power transferred through the geared architecture divided by gear volume multiplied by a gear reduction ratio and is between 219 and 328.

2. The turbofan engine as recited in claim 1, wherein the geared architecture includes an axial length between 3.03 and 4.60 inches.

3. The turbofan engine as recited in claim 2, wherein the turbofan engine includes an overall axial distance from a forward part of the fan hub to a forward bearing assembly and a ratio of the overall axial distance to the axial length of the geared architecture is between 6 and 18.

4. The turbofan engine as recited in claim 2, wherein the geared architecture comprises an epicyclic gear system including a ring gear circumscribing a plurality of planetary gears driven by a sun gear and a carrier supporting the planetary gears and the gear volume is defined within a space bounded by the ring gear and outer periphery of the carrier.

5. The turbofan engine as recited in claim 4, wherein the gear volume is between 526 in³ and 790 in³.

6. The turbofan engine as recited in claim 1, wherein the fan hub includes a hub diameter supporting the plurality of fan blades, the plurality of fan blades including a tip diameter with a ratio of the hub diameter to the tip diameter is between 0.24 and 0.36.

7. The turbofan engine as recited in claim 6, wherein a ratio of the hub diameter to the inlet diameter is between 0.63 and 0.94.

8. The turbofan engine as recited in claim 7, wherein the geared architecture includes an outer diameter less than the inlet diameter.

9. The turbofan engine as recited in claim 8, wherein the geared architecture includes the outer diameter greater than the outlet diameter.

10. The turbofan engine as recited in claim 6, including a forward bearing assembly spaced an axial distance from the outlet to the compressor and an overall distance from a forward part of the fan hub and a ratio of the overall distance relative to the axial distance between the forward bearing assembly and the outlet to the compressor is between 4.3 and 17.5.

11. The turbofan engine as recited in claim 6, including a forward bearing assembly disposed at a diameter and a ratio of the outlet diameter of the outlet to the compressor to the bearing assembly diameter is between 1.95 and 2.92.

12. The turbofan engine as recited in claim 1, wherein the geared architecture comprises an epicyclic gear system including a ring gear circumscribing a plurality of planetary gears driven by a sun gear and a carrier supporting the planetary gears and the gear volume is defined within a space bounded by the ring gear and outer periphery of the carrier.

13. The turbofan engine as recited in claim 1, wherein the turbofan engine is sized to generate thrust ranging between 12,500 lbf and 17,500 lbf.

14. The turbofan engine as recited in claim 1, wherein the turbine section includes a two stage high pressure turbine and a fan drive turbine coupled to drive the geared architecture.

15. The turbofan engine as recited in claim 14, wherein the fan drive turbine includes between three and six turbine rotors.

16. A front section of a turbofan engine comprising:
    a fan section including a plurality of fan blades;
    a geared architecture driven by a turbine section for rotating the fan section about an axis, wherein the geared architecture comprises an epicyclic gear system including a ring gear circumscribing a plurality of planetary gears driven by a sun gear and a carrier supporting the planetary gears and a gear volume is defined within a space bounded by the ring gear and outer periphery of the carrier and is between 526 in³ and 790 in³; and
    a compressor entrance passage disposed around the geared architecture including an inlet disposed at an inlet diameter and an outlet disposed at an outlet diameter, wherein a ratio of the inlet diameter to the outlet diameter is between 1.22 and 1.82.

17. The front section as recited in claim 16, wherein the geared architecture includes an outer diameter less than the outlet diameter.

18. The front section as recited in claim 17, wherein a geared architecture power transfer parameter (PTP) is defined as power transferred through the geared architecture divided by gear volume multiplied by a gear reduction ratio and is between about 219 and 328.

19. The front section as recited in claim 18, wherein the fan section includes a fan hub including a hub diameter supporting the plurality of fan blades and the plurality of fan blades including a tip diameter with a ratio of the hub diameter to the tip diameter is between 0.24 and 0.36.

20. The front section as recited in claim 19, including an overall axial length between a forward portion of the fan hub and a forward bearing assembly, wherein the forward bearing assembly is spaced axially aft of the outlet disposed at the outlet diameter an axial length and a ratio of the overall axial length to the axial length between the forward bearing assembly and the outlet disposed at the outlet diameter is between 4.3 and 17.5.

21. The front section as recited in claim 20, including a forward bearing assembly disposed at a diameter and a ratio of the outlet diameter to the bearing assembly diameter is between 1.95 and 2.92.

22. The front section as recited in claim 21, including an overall axial length between the forward portion of the fan hub and the forward bearing assembly, wherein the geared architecture includes an axial length and a ratio of the overall axial length to the axial length of the geared architecture is between 6 and 18.

23. The front section as recited in claim 22, wherein a ratio of the hub diameter to the inlet diameter is between 0.63 and 0.94.

* * * * *